United States Patent
Yamada et al.

(10) Patent No.: US 11,066,556 B2
(45) Date of Patent: Jul. 20, 2021

(54) POLYCARBONATE RESIN COMPOSITION

(71) Applicant: IDEMITSU KOSAN CO., LTD., Tokyo (JP)

(72) Inventors: Aki Yamada, Sodegaura (JP); Yasuhiro Ishikawa, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 16/064,055

(22) PCT Filed: Dec. 13, 2016

(86) PCT No.: PCT/JP2016/087121
§ 371 (c)(1),
(2) Date: Jun. 20, 2018

(87) PCT Pub. No.: WO2017/110598
PCT Pub. Date: Jun. 29, 2017

(65) Prior Publication Data
US 2018/0355178 A1    Dec. 13, 2018

(30) Foreign Application Priority Data

Dec. 22, 2015 (JP) .............................. JP2015-250579

(51) Int. Cl.
  *C08L 69/00* (2006.01)
  *C08L 83/10* (2006.01)
  *C08G 77/448* (2006.01)

(52) U.S. Cl.
  CPC .............. *C08L 83/10* (2013.01); *C08L 69/00* (2013.01); *C08G 77/448* (2013.01); *C08L 2205/025* (2013.01); *C08L 2205/03* (2013.01); *C08L 2205/035* (2013.01)

(58) Field of Classification Search
  None
  See application file for complete search history.

(56) References Cited

U.S. PATENT DOCUMENTS

| | | | |
|---|---|---|---|
| 4,335,032 A | 6/1982 | Rosenquist | |
| 2005/0187372 A1 | 8/2005 | Venderbosch et al. | |
| 2014/0357781 A1* | 12/2014 | Yang ..................... | C08L 83/00 524/537 |
| 2017/0275460 A1* | 9/2017 | Aoki ...................... | C08L 83/10 |

FOREIGN PATENT DOCUMENTS

| | | |
|---|---|---|
| CN | 101687986 A | 3/2010 |
| CN | 102652149 A | 8/2012 |
| CN | 102933657 A | 2/2013 |
| CN | 103857745 A | 6/2014 |
| JP | H05-140461 A | 6/1993 |
| JP | H08-81620 A | 3/1996 |
| JP | 2006-523243 A | 10/2006 |
| JP | 2008-280490 A | 11/2008 |
| JP | 2011-046911 A | 3/2011 |
| JP | 2011-122048 A | 6/2011 |
| JP | 2012-246430 A | 12/2012 |
| TW | 201323517 A1 | 6/2013 |
| WO | WO-2013/051557 A1 | 4/2013 |
| WO | WO-2014/191973 A1 | 12/2014 |
| WO | WO2015098395 * | 7/2015 |

OTHER PUBLICATIONS

Translation of WO 2013/051557 (obtained from Indian Patent Office). (Year: 2016).*
International Search Report with English language translation and Written Opinion issued in International Application No. PCT/JP2016/087121 dated Mar. 7, 2017.
Office Action dated Jul. 3, 2020 for corresponding Chinese Patent Application No. 201680074785.4.
Office Action dated Apr. 24, 2020 for corresponding Indian Patent Application No. 201847023357.
Office Action dated Sep. 15, 2020 for correspinding Japanese Patent Application No. 2017-558052.
Office Action dated Dec. 7, 2020 for corresponding Taiwanese Patent Application No. 105142191.

* cited by examiner

*Primary Examiner* — David J Buttner
(74) *Attorney, Agent, or Firm* — Foley & Lardner LLP

(57) ABSTRACT

Provided is a polycarbonate-based resin composition containing: a polycarbonate-polyorganosiloxane copolymer (A-1) which contains a specific repeating unit and in which a polyorganosiloxane block has an average chain length of 20 or more and less than 60; a polycarbonate-polyorganosiloxane copolymer (A-2) which contains a specific repeating unit and in which a polyorganosiloxane block has an average chain length of 60 or more and less than 500; and a polycarbonate-based resin (A-3) except the polycarbonate-polyorganosiloxane copolymer (A-1) and the polycarbonate-polyorganosiloxane copolymer (A-2), wherein the ratio of the polycarbonate-based resin (A-3) to the total weight of the polycarbonate-polyorganosiloxane copolymer (A-1), the polycarbonate-polyorganosiloxane copolymer (A-2), and the polycarbonate-based resin (A-3) is 10 mass % or more.

16 Claims, No Drawings

POLYCARBONATE RESIN COMPOSITION

RELATED APPLICATIONS

The present application claims priority under 37 U.S.C. § 371 to International Patent Application No. PCT/JP2016/087121, filed Dec. 13, 2016, which claims priority to and the benefit of Japanese Patent Application No. 2015-250579, filed on Dec. 22, 2015. The contents of these applications are hereby incorporated by reference in their entireties.

TECHNICAL FIELD

The present invention relates to a polycarbonate-based resin composition excellent in impact resistance, transparency, and heat resistance.

BACKGROUND ART

A polycarbonate-polyorganosiloxane copolymer (hereinafter sometimes abbreviated as "PC-POS copolymer") has been attracting attention because of its excellent properties, such as high impact resistance, high chemical resistance, and high flame retardancy. Accordingly, the copolymer has been expected to be widely utilized in various fields, such as an electrical and electronic equipment field, and an automobile field. In particular, the copolymer has been widely utilized in casings for a cellular phone, a mobile personal computer, a digital camera, a video camera, an electric tool, and the like, and other daily necessities.

In normal cases, a homopolycarbonate using 2,2-bis(4-hydroxyphenyl)propane [common name: bisphenol A] as a dihydric phenol serving as a raw material has been generally used as a typical polycarbonate. In order to improve the physical properties of the homopolycarbonate, such as flame retardancy and impact resistance, it has been known that a polycarbonate-based resin composition is obtained by mixing the homopolycarbonate with a polycarbonate-polyorganosiloxane copolymer using a polyorganosiloxane as a copolymerizable monomer (Patent Document 1).

When the impact resistance of the polycarbonate-polyorganosiloxane copolymer, in particular, impact resistance under low temperature is improved, as disclosed in Patent Document 2, a method involving using a polyorganosiloxane having a long chain length as a raw material for the copolymer has been known. However, the method has involved a problem in that the transparency of the copolymer reduces.

In contrast, in order to further improve the transparency of the polycarbonate-polyorganosiloxane copolymer, a method involving using a polyorganosiloxane having a relatively short chain length as a raw material for the copolymer has been known (see Patent Documents 3 and 4). However, the method has involved a problem in that the impact resistance reduces.

CITATION LIST

Patent Document

Patent Document 1: JP 05-140461 A
Patent Document 2: JP 2012-246430 A
Patent Document 3: JP 08-81620 A
Patent Document 4: JP 2011-46911 A

SUMMARY OF INVENTION

Technical Problem

An object of the present invention is to provide a polycarbonate-based resin composition that is excellent in impact resistance, in particular, low-temperature impact resistance, and that is excellent in transparency and heat resistance.

Solution to Problem

Even when a polycarbonate-polyorganosiloxane copolymer having a polyorganosiloxane block having a long chain length, the copolymer having excellent impact resistance, in particular, excellent impact resistance under low temperature, is mixed with a homopolycarbonate-based resin having high transparency for improving its transparency, an improving effect on the transparency still leaves points to be improved.

The inventors of the present invention have made extensive investigations, and as a result, have found that such problems are solved by producing a specific polycarbonate-based resin composition containing a polycarbonate-polyorganosiloxane copolymer having a short chain length, a polycarbonate-polyorganosiloxane copolymer having a long chain length, and any other polycarbonate resin.

That is, the present invention relates to the following items [1] to [19].

[1] A polycarbonate-based resin composition, comprising:
a polycarbonate-polyorganosiloxane copolymer (A-1) containing a polycarbonate block formed of a repeating unit represented by the following general formula (I) and a polyorganosiloxane block containing a repeating unit represented by the following general formula (II), the polyorganosiloxane block having an average chain length of 20 or more to less than 60;
a polycarbonate-polyorganosiloxane copolymer (A-2) containing a polycarbonate block formed of a repeating unit represented by the following general formula (I) and a polyorganosiloxane block containing a repeating unit represented by the following general formula (II), the polyorganosiloxane block having an average chain length of 60 or more to less than 500; and
a polycarbonate-based resin (A-3) except the polycarbonate-polyorganosiloxane copolymer (A-1) and the polycarbonate-polyorganosiloxane copolymer (A-2),
wherein a ratio of the polycarbonate-based resin (A-3) to a total weight of the polycarbonate-polyorganosiloxane copolymer (A-1), the polycarbonate-polyorganosiloxane copolymer (A-2), and the polycarbonate-based resin (A-3) is 10 mass % or more:

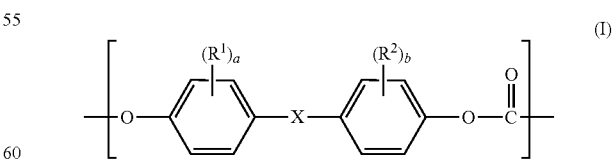

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

[2] The polycarbonate-based resin composition according to Item [1], wherein a ratio of the polycarbonate-polyorganosiloxane copolymer (A-1) to the total weight of the polycarbonate-polyorganosiloxane copolymer (A-1), the polycarbonate-polyorganosiloxane copolymer (A-2), and the polycarbonate-based resin (A-3) is 70 mass % or less.

[3] The polycarbonate-based resin composition according to Item [1] or [2], wherein the ratio of the polycarbonate-based resin (A-3) to the total weight of the polycarbonate-polyorganosiloxane copolymer (A-1), the polycarbonate-polyorganosiloxane copolymer (A-2), and the polycarbonate-based resin (A-3) is 20 mass % or more.

[4] The polycarbonate-based resin composition according to any one of Items [1] to [3], wherein the ratio of the polycarbonate-based resin (A-3) to the total weight of the polycarbonate-polyorganosiloxane copolymer (A-1), the polycarbonate-polyorganosiloxane copolymer (A-2), and the polycarbonate-based resin (A-3) is less than 45 mass %.

[5] The polycarbonate-based resin composition according to any one of Items [1] to [4], wherein a ratio of the polycarbonate-polyorganosiloxane copolymer (A-2) to the total weight of the polycarbonate-polyorganosiloxane copolymer (A-1), the polycarbonate-polyorganosiloxane copolymer (A-2), and the polycarbonate-based resin (A-3) is 10 mass % or more.

[6] The polycarbonate-based resin composition according to any one of Items [1] to [5], wherein a ratio of the polycarbonate-polyorganosiloxane copolymer (A-2) to the total weight of the polycarbonate-polyorganosiloxane copolymer (A-1), the polycarbonate-polyorganosiloxane copolymer (A-2), and the polycarbonate-based resin (A-3) is 15 mass % or more.

[7] The polycarbonate-based resin composition according to any one of Items [1] to [6], wherein a weight ratio "(A-1)/(A-2)" of the polycarbonate-polyorganosiloxane copolymer (A-1) to the polycarbonate-polyorganosiloxane copolymer (A-2) is from 10/90 to 99/1.

[8] The polycarbonate-based resin composition according to any one of Items [1] to [7], wherein a weight ratio "(A-1)/(A-2)" of the polycarbonate-polyorganosiloxane copolymer (A-1) to the polycarbonate-polyorganosiloxane copolymer (A-2) is from 60/40 to 99/1.

[9] The polycarbonate-based resin composition according to any one of Items [1] to [8], wherein a weight ratio "(A-1)/(A-2)" of the polycarbonate-polyorganosiloxane copolymer (A-1) to the polycarbonate-polyorganosiloxane copolymer (A-2) is from 72/28 to 99/1.

[10] The polycarbonate-based resin composition according to any one of Items [1] to [9], wherein an amount of a polyorganosiloxane in the polycarbonate-polyorganosiloxane copolymer (A-1) is from 1 mass % to 20 mass %.

[11] The polycarbonate-based resin composition according to any one of Items [1] to [10], wherein an amount of a polyorganosiloxane in the polycarbonate-polyorganosiloxane copolymer (A-2) is from 1 mass % to 45 mass %.

[12] The polycarbonate-based resin composition according to any one of Items [1] to [11], wherein the polycarbonate-based resin (A-3) comprises a polycarbonate resin formed only of a repeating unit represented by the following general formula (III):

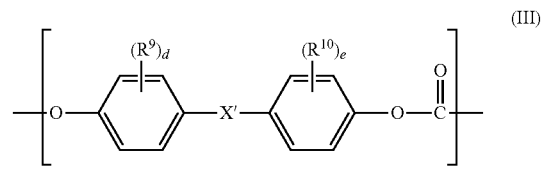

wherein $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and d and e each independently represent an integer of from 0 to 4.

[13] The polycarbonate-based resin composition according to any one of Items [1] to [12], wherein an amount of polyorganosiloxanes in the polycarbonate-based resin composition is from 1 mass % to 20 mass %.

[14] The polycarbonate-based resin composition according to any one of Items [1] to [13], wherein the polycarbonate-based resin composition has a viscosity-average molecular weight of from 12,000 to 30,000.

[15] The polycarbonate-based resin composition according to any one of Items [1] to [14], wherein the polycarbonate-based resin composition has a viscosity-average molecular weight of from 18,000 to 22,000.

[16] The polycarbonate-based resin composition according to any one of Items [1] to [15], wherein the polycarbonate-polyorganosiloxane copolymer (A-1) has a viscosity-average molecular weight of from 12,000 to 30,000.

[17] The polycarbonate-based resin composition according to any one of Items [1] to [16], wherein the polycarbonate-polyorganosiloxane copolymer (A-2) has a viscosity-average molecular weight of from 12,000 to 30,000.

[18] The polycarbonate-based resin composition according to any one of Items [1] to [17], wherein the polycarbonate-based resin (A-3) has a viscosity-average molecular weight of from 12,000 to 50,000.

[19] The polycarbonate-based resin composition according to any one of Items [1] to [18], wherein the polycarbonate-based resin (A-3) has a viscosity-average molecular weight of from 19,000 to 30,000.

Advantageous Effects of Invention

According to the present invention, the polycarbonate-based resin composition excellent in impact resistance including low-temperature impact resistance, transparency, and heat resistance can be provided.

DESCRIPTION OF EMBODIMENTS

A polycarbonate-based resin composition of the present invention is described in detail below. In this description, a specification considered to be preferred can be arbitrarily adopted, and a combination of preferred specifications can be said to be more preferred. In addition, the term "XX to YY" as used herein means "from XX or more to YY or less."

The present invention relates to a polycarbonate-based resin composition, comprising:

a polycarbonate-polyorganosiloxane copolymer (A-1) containing a polycarbonate block formed of a repeating unit represented by the following general formula (I) and a polyorganosiloxane block containing a repeating unit represented by the following general formula (II), the polyorganosiloxane block having an average chain length of 20 or more to less than 60;

a polycarbonate-polyorganosiloxane copolymer (A-2) containing a polycarbonate block formed of a repeating unit represented by the following general formula (I) and a polyorganosiloxane block containing a repeating unit represented by the following general formula (II), the polyorganosiloxane block having an average chain length of 60 or more to less than 500; and a polycarbonate-based resin (A-3) except the polycarbonate-polyorganosiloxane copolymer (A-1) and the polycarbonate-polyorganosiloxane copolymer (A-2), wherein a ratio of the polycarbonate-based resin (A-3) to a total weight of the polycarbonate-polyorganosiloxane copolymer (A-1), the polycarbonate-polyorganosiloxane copolymer (A-2), and the polycarbonate-based resin (A-3) is 10 mass % or more:

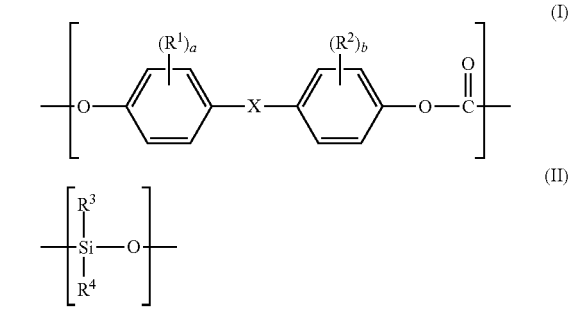

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

[Polycarbonate-Polyorganosiloxane Copolymer]

As described above, the polycarbonate-polyorganosiloxane copolymers serving as the components (A-1) and (A-2) in the polycarbonate-based resin composition of the present invention each contain the polycarbonate block formed of a repeating unit represented by the following general formula (I) and the polyorganosiloxane block containing a repeating unit represented by the following general formula (II).

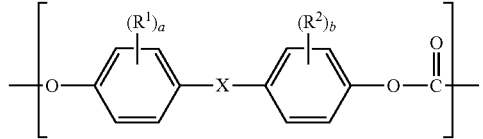
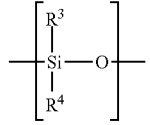

Examples of the halogen atom that $R^1$ and $R^2$ in the general formula (I) each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups ("various" means that a linear group and any branched group are included, and the same applies hereinafter), various pentyl groups, and various hexyl groups. An example of the alkoxy group that $R^1$ and $R^2$ each independently represent is an alkoxy group whose alkyl group moiety is the alkyl group described above.

The alkylene group represented by X is, for example, a methylene group, an ethylene group, a trimethylene group, a tetramethylene group, or a hexamethylene group, and is preferably an alkylene group having 1 to 5 carbon atoms. Examples of the alkylidene group represented by X include an ethylidene group and an isopropylidene group. The cycloalkylene group represented by X is, for example, a cyclopentanediyl group, a cyclohexanediyl group, or a cyclooctanediyl group, and is preferably a cycloalkylene group having 5 to 10 carbon atoms. The cycloalkylidene group represented by X is, for example, a cyclohexylidene group, a 3,5,5-trimethylcyclohexylidene group, or a 2-adamantylidene group, and is preferably a cycloalkylidene group having 5 to 10 carbon atoms, more preferably a cycloalkylidene group having 5 to 8 carbon atoms. As an aryl moiety of the arylalkylene group represented by X, there are given, for example, aryl groups each having 6 to 14 ring-forming carbons, such as a phenyl group, a naphthyl group, a biphenyl group, and an anthryl group. As an aryl moiety of the arylalkylidene group represented by X, there are given, for example, aryl groups each having 6 to 14 ring-forming carbons, such as a phenyl group, a naphthyl group, a biphenyl group, and an anthryl group.

a and b each independently represent an integer of from 0 to 4, preferably from 0 to 2, more preferably 0 or 1.

Among them, the following is suitable: a repeating unit in which a and b each represent 0, and X represents a single bond or an alkylene group having 1 to 8 carbon atoms, or a repeating unit in which a and b each represent 0, and X represents an alkylene group having 3 carbon atoms, particularly an isopropylidene group.

Examples of the halogen atom that $R^3$ and $R^4$ in the general formula (II) each independently represent include a fluorine atom, a chlorine atom, a bromine atom, and an iodine atom. Examples of the alkyl group that $R^3$ and $R^4$ each independently represent include a methyl group, an ethyl group, a n-propyl group, an isopropyl group, various butyl groups, various pentyl groups, and various hexyl groups. An example of the alkoxy group that $R^3$ and $R^4$ each independently represent is an alkoxy group whose alkyl group moiety is the alkyl group described above. Examples of the aryl group that $R^3$ and $R^4$ each independently represent include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

More specifically, the polyorganosiloxane block containing a repeating unit represented by the general formula (II) preferably contains a unit represented by any one of the following general formulae (II-I) to (II-III):

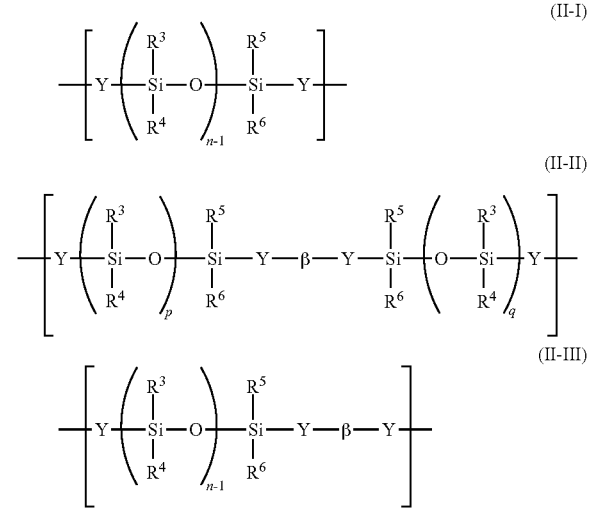

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ or $R^6$ may be identical to or different from each other, Y represents —$R^7$O—, —$R^7$COO—, —$R^7$NH—, —$R^7NR^8$—, —COO—, —S—, —$R^7$COO—$R^9$—O—, or —$R_7$O—$R^{10}$—O—, and a plurality of Y may be identical to or different from each other, the $R^7$ represents a single bond, a linear, branched, or cyclic alkylene group, a divalent organic residue containing an aliphatic group and an aromatic group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, R represents a divalent group derived from a diisocyanate compound, or a divalent group derived from a dicarboxylic acid or a halide of a dicarboxylic acid, n represents the average chain length of a polyorganosiloxane, p and q each represent an integer of 1 or more, and the sum of p and q is n–2.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. An example of the alkoxy group that $R^3$ to $R^6$ each independently represent is an alkoxy group whose alkyl group moiety is the alkyl group described above. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

It is more preferred that $R^3$ to $R^6$ in the general formula (II-I), the general formula (II-II), and/or the general formula (II-III) each represent a methyl group.

The linear or branched alkylene group represented by $R^7$ in —$R^7$O—, —$R^7$COO—, —$R^7$NH—, —$R^7$NR—, —$R^7$COO—$R^{10}$—O—, or —$R^7$O—$R^{10}$—O-represented by Y is, for example, an alkylene group having 1 to 8, preferably 1 to 5 carbon atoms, and the cyclic alkylene group represented by $R^7$ is, for example, a cycloalkylene group having 5 to 15, preferably 5 to 10 carbon atoms.

The divalent organic residue containing an aliphatic group and an aromatic group represented by $R^7$ may further have a substituent, such as an alkoxy group or an alkyl group, on its aromatic ring, and a specific structure thereof may be, for example, a structure represented by the following general formula (x) or (xi), provided that in the case of the following general formula, the alkylene group is bonded to Si:

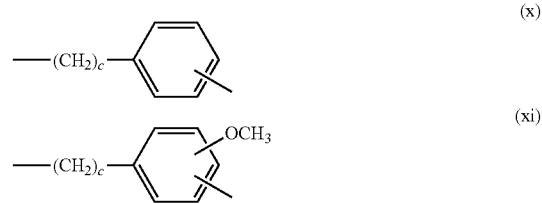

wherein c represents a positive integer and typically represents an integer of from 1 to 6.

The diarylene group represented by any one of $R^7$, $R^9$ and $R^{10}$ is a group in which two arylene groups are linked to each other directly or through a divalent organic group, and is specifically a group having a structure represented by —$Ar^1$—W—$Ar^2$—. Here, $Ar^1$ and $Ar^2$ each represent an arylene group, and W represents a single bond or a divalent organic group. Examples of the divalent organic group represented by W include an isopropylidene group, a methylene group, a dimethylene group and a trimethylene group.

Examples of the arylene group represented by any one of $R^7$, $Ar^1$ and $Ar^2$ include arylene groups each having 6 to 14 ring-forming carbon atoms, such as a phenylene group, a naphthylene group, a biphenylene group, and an anthrylene group. Those arylene groups may each further have an arbitrary substituent, such as an alkoxy group or an alkyl group.

The alkyl group represented by $R^8$ is a linear or branched group having 1 to 8, preferably 1 to 5 carbon atoms. The alkenyl group represented by $R^8$ is, for example, a linear or branched group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched, or cyclic alkylene group represented by $R^{10}$ is the same as that represented by $R^7$.

Y preferably represents —$R^7$O— in which $R^7$ represents a divalent organic residue containing an aliphatic group and an aromatic group. In particular, —$R^7$O— represents a divalent residue of a phenol-based compound having an alkyl group, and more preferably represents, for example, a divalent organic residue derived from allylphenol or a divalent organic residue derived from eugenol, which is specifically represented by any one of the following formulae:

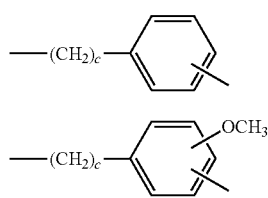

wherein c represents a positive integer and typically represents an integer of from 1 to 6.

With regard to p and q in the formula (II-II), it is preferred that p=q, i.e., p=(n−2)/2 and q=(n−2)/2.

β represents a divalent group derived from a diisocyanate compound, or a divalent group derived from a dicarboxylic acid or a halide of a dicarboxylic acid, and examples thereof include divalent groups represented by the following general formulae (xiii) to (xvii).

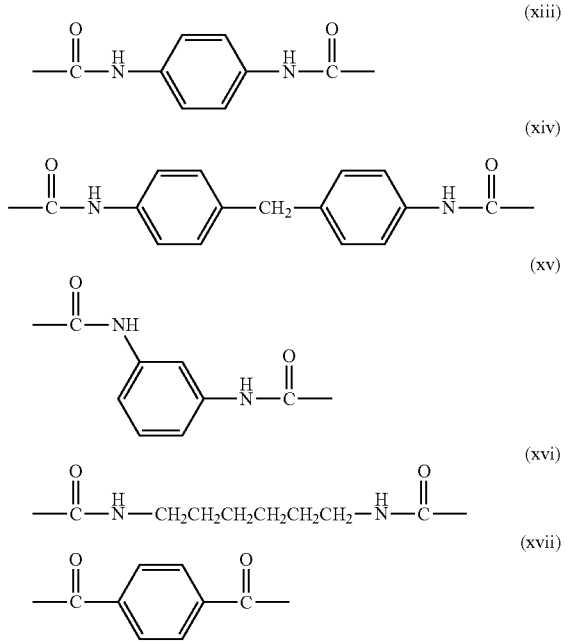

[Polycarbonate-Polyorganosiloxane Copolymer (A-1)]

In the polycarbonate-polyorganosiloxane copolymer (A-1) in the resin composition of the present invention, the average chain length of the polyorganosiloxane block containing a repeating unit represented by the formula (II) needs to be 20 or more to less than 60. That is, n in each of the formulae (II-I) and (II-III) is 20 or more to less than 60, and in the case of the formula (II-II), a number obtained by adding 2 to the sum of p and q falls within the range. The average chain length is calculated by nuclear magnetic resonance (NMR) measurement. The chain length is preferably from 25 to 55, more preferably from 30 to 45. When the average chain length of the polycarbonate-polyorganosiloxane copolymer (A-1) is 20 or more to less than 60, excellent transparency is obtained.

The amount of the polyorganosiloxane (the content of the polyorganosiloxane block containing a repeating unit represented by the formula (II); the same applies hereinafter) in the polycarbonate-polyorganosiloxane copolymer (A-1) is preferably from 1 mass % to 20 mass %, more preferably from 1.5 mass % to 10 mass %. When the amount of the polyorganosiloxane in the polycarbonate-polyorganosiloxane copolymer (A-1) falls within the range, a polycarbonate-based resin composition having excellent transparency can be obtained.

The viscosity-average molecular weight of the polycarbonate-polyorganosiloxane copolymer (A-1) is preferably from 12,000 to 30,000, more preferably from 15,000 to 25,000, still more preferably from 16,000 to 19,000. A method of calculating the viscosity-average molecular weight is described later.

[Polycarbonate-Polyorganosiloxane Copolymer (A-2)]

In the polycarbonate-polyorganosiloxane copolymer (A-2) in the resin composition of the present invention, the average chain length of the polyorganosiloxane block containing a repeating unit represented by the formula (II) needs to be 60 or more to less than 500. That is, n in each of the formulae (II-I) and (II-III) is 60 or more to less than 500, and in the case of the formula (II-II), a number obtained by adding 2 to the sum of p and q falls within the range. The average chain length is calculated by nuclear magnetic resonance (NMR) measurement. The chain length is preferably from 70 to 300, more preferably from 80 to 200. When the chain length of the polycarbonate-polyorganosiloxane copolymer (A-2) is 60 or more to less than 500, excellent impact resistance is obtained.

The amount of the polyorganosiloxane in the polycarbonate-polyorganosiloxane copolymer (A-2) is preferably from 1 mass % to 45 mass %, more preferably from 1.5 mass % to 35 mass %, still more preferably from 2 mass % to 10 mass %. When the amount of the polyorganosiloxane in the polycarbonate-polyorganosiloxane copolymer (A-2) falls within the range, a polycarbonate-based resin composition having excellent impact resistance can be obtained.

The viscosity-average molecular weight of the polycarbonate-polyorganosiloxane copolymer (A-2) is preferably from 12,000 to 30,000, more preferably from 15,000 to 25,000, still more preferably from 16,000 to 19,000. A method of calculating the viscosity-average molecular weight is described later.

[Polycarbonate-Based Resin (A-3)]

The polycarbonate-based resin composition of the present invention further comprises a polycarbonate-based resin (A-3) except the polycarbonate-polyorganosiloxane copolymer (A-1) and the polycarbonate-polyorganosiloxane copolymer (A-2). The polycarbonate-based resin (A-3) is preferably an aromatic polycarbonate-based resin, more preferably an aromatic polycarbonate-based resin formed only of a repeating unit represented by the following general formula (III):

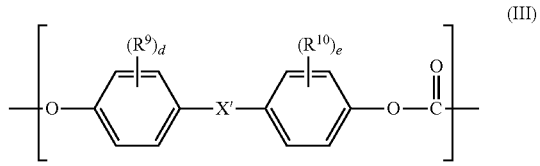

wherein $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and d and e each independently represent an integer of from 0 to 4.

Specific examples of $R^9$ and $R^{10}$ include the same examples as those of the $R^1$ and the $R^2$, and preferred examples thereof are also the same as those of the $R^1$ and the $R^2$. $R^9$ and $R^{10}$ each more preferably represent an alkyl group having 1 to 6 carbon atoms or an alkoxy group having 1 to 6 carbon atoms. Specific examples of X' include the same examples as those of the X, and preferred examples thereof are also the same as those of the X. d and e each independently represent preferably from 0 to 2, more preferably 0 or 1.

The viscosity-average molecular weight of the polycarbonate-based resin (A-3) is preferably from 12,000 to 50,000, more preferably from 15,000 to 35,000, still more preferably from 17,000 to 33,000, particularly preferably from 19,000 to 30,000. A method of calculating the viscosity-average molecular weight is described later.

In the polycarbonate-based resin composition of the present invention, the ratio of the polycarbonate-based resin (A-3) to the total weight of the polycarbonate-polyorganosiloxane copolymer (A-1), the polycarbonate-polyorganosiloxane copolymer (A-2), and the polycarbonate-based resin (A-3) needs to be 10 mass % or more. When the ratio of the polycarbonate-based resin (A-3) is 10 mass % or more, excellent transparency and excellent heat resistance of the polycarbonate-based resin composition can be obtained. The ratio of the polycarbonate-based resin (A-3) to the total weight of the three components is preferably 20 mass % or more. The ratio of the polycarbonate-based resin (A-3) to the total weight of the three components is preferably less than 45 mass %, more preferably 43 mass % or less, still more preferably 40 mass % or less.

The amounts of the polycarbonate-polyorganosiloxane copolymer (A-1) and the polycarbonate-polyorganosiloxane copolymer (A-2) among the three components in the present invention each independently preferably fall within the following range. When the amounts fall within the ranges, the amounts can each adopt an arbitrary value to the extent that the total weight of the polycarbonate-polyorganosiloxane copolymer (A-1), the polycarbonate-polyorganosiloxane copolymer (A-2), and the polycarbonate-based resin (A-3) becomes 100.

The ratio of the polycarbonate-polyorganosiloxane copolymer (A-1) to the total weight of the three components is preferably set to 70 mass % or less. When the ratio of the polycarbonate-polyorganosiloxane copolymer (A-1) is 70 mass % or less, excellent transparency of the polycarbonate-based resin composition can be maintained, and excellent impact resistance thereof can be maintained.

The ratio of the polycarbonate-polyorganosiloxane copolymer (A-2) to the total weight of the three components is set to preferably 10 mass % or more, more preferably 15 mass % or more. When the ratio of the polycarbonate-polyorganosiloxane copolymer (A-2) is 10 mass % or more, excellent impact resistance of the polycarbonate-based resin composition can be maintained.

The weight ratio "(A-1)/(A-2)" of the polycarbonate-polyorganosiloxane copolymer (A-1) to the polycarbonate-polyorganosiloxane copolymer (A-2) is preferably from 10/90 to 99/1, more preferably from 60/40 to 99/1, still more preferably from 72/28 to 99/1, particularly preferably from 75/25 to 99/1. When the weight ratio "(A-1)/(A-2)" falls within the range, excellent impact-resisting characteristics including low-temperature impact resistance, and excellent transparency can be sufficiently obtained.

The amount of the polyorganosiloxanes in the polycarbonate-based resin composition of the present invention is preferably from 1 mass % to 20 mass %, more preferably from 1.5 mass % to 15 mass %, still more preferably from 2 mass % to 10 mass %. When the amount of the polyorganosiloxanes in the polycarbonate-based resin composition is from 1 mass % to 20 mass %, more excellent transparency and more excellent impact resistance can be obtained.

The viscosity-average molecular weight Mv of the polycarbonate-based resin composition of the present invention, which can be appropriately adjusted by using, for example, a molecular weight modifier so as to be a molecular weight intended for an application or a product in which the resin composition is used, is preferably from 12,000 to 30,000, more preferably from 15,000 to 25,000, still more preferably from 18,000 to 22,000, particularly preferably from 18,400 to 22,000. When the viscosity-average molecular weight is 12,000 or more, a sufficient strength of a molded article can be obtained. When the viscosity-average molecular weight is 30,000 or less, the injection molding or extrusion molding of the resin composition can be performed at such a temperature that its heat deterioration does not occur.

The viscosity-average molecular weight (Mv) is a value calculated from the following Schnell's equation by measuring the limiting viscosity [η] of a methylene chloride solution at 20° C. (concentration: g/L).

$$[\eta]=1.23\times10^{-5}\times M v^{0.83}$$

[Production Method for Polycarbonate-Polyorganosiloxane Copolymer]

The polycarbonate-polyorganosiloxane copolymers corresponding to the components (A-1) and (A-2) in the polycarbonate-based resin composition of the present invention can each be produced by a known production method, such as an interfacial polymerization method (phosgene method), a pyridine method, or an ester exchange method. Particularly in the case of the interfacial polymerization method, the step of separating an organic phase containing the PC-POS copolymer and an aqueous phase containing an unreacted substance, a catalyst residue, or the like becomes easy, and the separation of the organic phase containing the PC-POS copolymer and the aqueous phase in each washing step based on alkali washing, acid washing, or pure water washing becomes easy. Accordingly, the PC-POS copolymer is efficiently obtained. With regard to the method of producing the PC-POS copolymer, reference can be made to a method described in, for example, JP 2005-60599 A.

Specifically, the copolymer can be produced by: dissolving an aromatic polycarbonate oligomer produced in advance to be described later and the polyorganosiloxane in a water-insoluble organic solvent (such as methylene chloride); adding an alkaline compound aqueous solution (such as aqueous sodium hydroxide) of a dihydric phenol-based compound (such as bisphenol A) to the solution; and subjecting the mixture to an interfacial polycondensation reaction through the use of a tertiary amine (such as triethylamine) or a quaternary ammonium salt (such as trimethylbenzylammonium chloride) as a polymerization catalyst in the presence of a terminal stopper (a monohydric phenol, such as p-t-butylphenol). In addition, the PC-POS copolymer can be produced by copolymerizing the polyorganosiloxane, a dihydric phenol, and phosgene, a carbonate ester, or a chloroformate.

A polyorganosiloxane represented by the following general formula (i), the following general formula (ii), and/or the following general formula (iii) can be used as the polyorganosiloxane serving as a raw material:

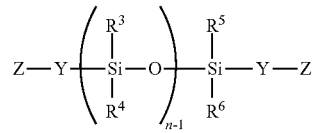
(i)

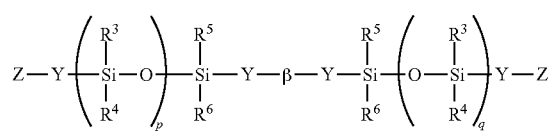
(ii)

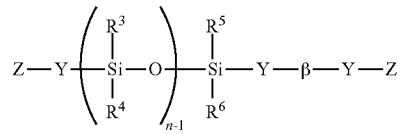
(iii)

wherein $R^3$ to $R^6$, Y, β, n−1, p and q are as described above, and specific examples thereof and preferred examples thereof are also the same as those described above.

Z represents a hydrogen atom or a halogen atom, and a plurality of Z may be identical to or different from each other.

Examples of the polyorganosiloxane represented by the general formula (i) include compounds represented by the following general formulae (i-i) to (i-xi):

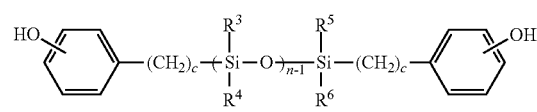
(i-i)

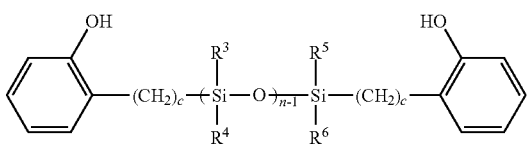
(i-ii)

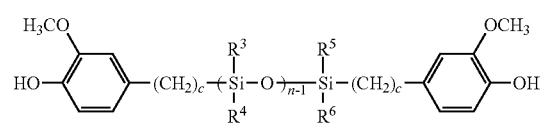
(i-iii)

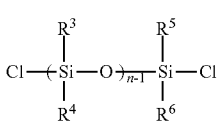
(i-iv)

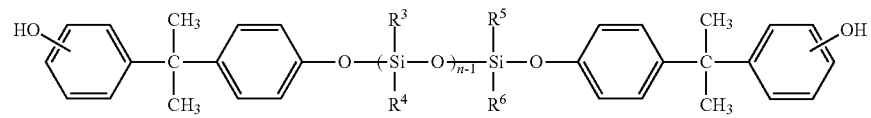
(i-v)

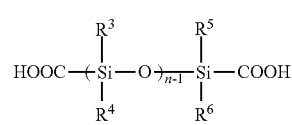
(i-vi)

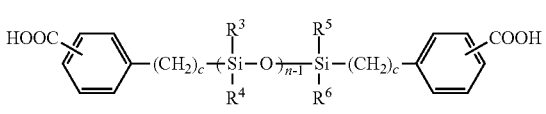
(i-vii)

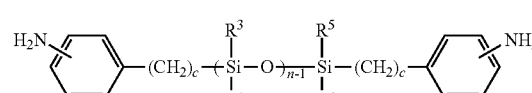
(i-viii)

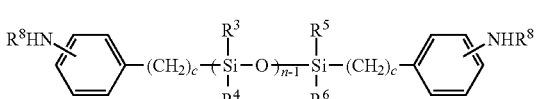
(i-ix)

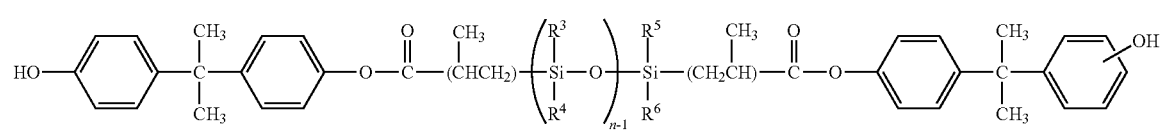
(i-x)

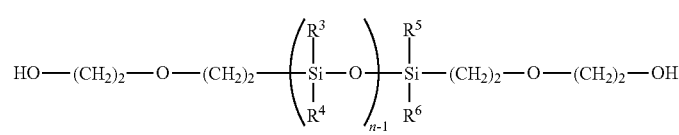
(i-xi)

In the general formulae (i-i) to (i-xi), $R^3$ to $R^6$, n, and $R^8$ are as defined above, and preferred examples thereof are also the same as those described above, and c represents a positive integer and typically represents an integer of from 1 to 6.

Among them, a phenol-modified polyorganosiloxane represented by the general formula (i-i) is preferred from the viewpoint of its ease of polymerization. An α,ω-bis[3-(o-hydroxyphenyl)propyl]polydimethylsiloxane, which is one compound represented by the general formula (i-ii), or an α,ω-bis[3-(4-hydroxy-3-methoxyphenyl)propyl]polydimethylsiloxane, which is one compound represented by the general formula (i-iii), is preferred from the viewpoint of its ease of availability.

In addition to the foregoing, a compound having a structure represented by the following general formula (xii) may be used as a polyorganosiloxane raw material:

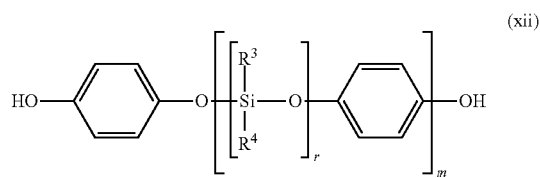

(xii)

wherein $R^3$ and $R^4$ are identical to those described above. The average chain length of the polyorganosiloxane block represented by the general formula (xii) is (r×m), and the range of the (r×m) is the same as that of the n.

When the compound represented by the general formula (xii) is used as a polyorganosiloxane raw material, the polyorganosiloxane block (II) preferably has a unit represented by the following general formula (II-IV):

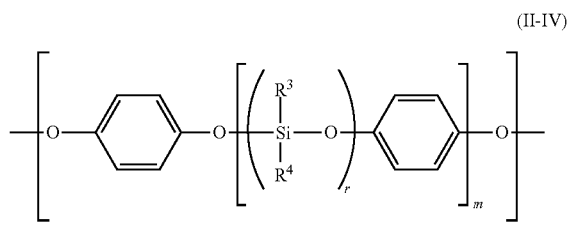

(II-IV)

wherein $R^3$, $R^4$, r and m are as described above.

A method of producing the polyorganosiloxane is not particularly limited. According to, for example, a method described in JP 11-217390 A, a crude polyorganosiloxane can be obtained by: causing cyclotrisiloxane and disiloxane to react with each other in the presence of an acid catalyst to synthesize α,ω-dihydrogen organopentasiloxane; and then subjecting a phenolic compound (such as 2-allylphenol, 4-allylphenol, eugenol, or 2-propenylphenol) or the like to an addition reaction with the α,ω-dihydrogen organopentasiloxane in the presence of a catalyst for a hydrosilylation reaction. According to a method described in JP 2662310 B2, the crude polyorganosiloxane can be obtained by: causing octamethylcyclotetrasiloxane and tetramethyldisiloxane to react with each other in the presence of sulfuric acid (acid catalyst); and subjecting a phenolic compound or the like to an addition reaction with the resultant α,ω-dihydrogen organopolysiloxane in the presence of the catalyst for a hydrosilylation reaction in the same manner as described above. The chain length n of the α,ω-dihydrogen organopolysiloxane can be appropriately adjusted depending on a polymerization condition therefor before its use, or a commercially available α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, a solution of chloroplatinic acid in an alcohol, an olefin complex of platinum, a complex of platinum and a vinyl group-containing siloxane, platinum-supported silica, and platinum-supported activated carbon.

An adsorbent is preferably caused to adsorb and remove a transition metal derived from a transition metal-based catalyst used as the catalyst for a hydrosilylation reaction in the crude polyorganosiloxane by bringing the crude polyorganosiloxane into contact with the adsorbent.

An adsorbent having an average pore diameter of, for example, 1,000 Å or less can be used as the adsorbent. When the average pore diameter is 1,000 Å or less, the transition metal in the crude polyorganosiloxane can be efficiently removed. From such viewpoint, the average pore diameter of the adsorbent is preferably 500 Å or less, more preferably 200 Å or less, still more preferably 150 Å or less, yet still more preferably 100 Å or less. From the same viewpoint, the adsorbent is preferably a porous adsorbent.

The adsorbent is not particularly limited as long as the adsorbent has the above-mentioned average pore diameter. For example, there may be used activated clay, acidic clay, activated carbon, synthetic zeolite, natural zeolite, activated alumina, silica, a silica-magnesia-based adsorbent, diatomaceous earth, and cellulose. Among them, preferred is at least one selected from the group consisting of activated clay, acidic clay, activated carbon, synthetic zeolite, natural zeolite, activated alumina, silica, and a silica-magnesia-based adsorbent.

After the adsorbent has been caused to adsorb the transition metal in the crude polyorganosiloxane, the adsorbent can be separated from the polyorganosiloxane by arbitrary separating means. Examples of the means for separating the adsorbent from the polyorganosiloxane include a filter and centrifugation. When the filter is used, a filter such as a membrane filter, a sintered metal filter, or a glass fiber filter can be used. Among them, the membrane filter is particularly preferably used.

The average particle diameter of the adsorbent is typically from 1 μm to 4 mm, preferably from 1 μm to 100 μm from the viewpoint of separating the adsorbent from the polyorganosiloxane after the adsorption of the transition metal.

When the adsorbent is used, its usage amount is not particularly limited. A porous adsorbent can be used in an amount in the range of preferably from 1 part by mass to 30 parts by mass, more preferably from 2 parts by mass to 20 parts by mass with respect to 100 parts by mass of the crude polyorganosiloxane.

When the crude polyorganosiloxane to be treated has so high a molecular weight that the crude polyorganosiloxane is not in a liquid state, the polyorganosiloxane may be heated to such a temperature as to be in a liquid state upon performance of the adsorption with the adsorbent and the separation of the adsorbent. Alternatively, the adsorption and the separation may be performed under a state in which the polyorganosiloxane is dissolved in a solvent, such as methylene chloride or hexane.

The polycarbonate oligomer can be produced through a reaction of a dihydric phenol and a carbonate precursor, such as phosgene or triphosgene, in an organic solvent, such methylene chloride, chlorobenzene, or chloroform. When the polycarbonate oligomer is produced by using an ester exchange method, the oligomer can also be produced through a reaction of a dihydric phenol and a carbonate precursor, such as diphenyl carbonate.

A dihydric phenol represented by the following general formula (iv) is preferably used as the dihydric phenol:

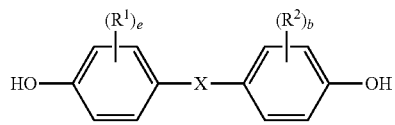

wherein $R^1$, $R^2$, a, b, and X are as described above.

Examples of the dihydric phenol represented by the general formula (iv) include a bis(hydroxyphenyl)alkane-based dihydric phenol, such as 2,2-bis(4-hydroxyphenyl) propane [bisphenol A], bis(4-hydroxyphenyl)methane, 1,1-bis(4-hydroxyphenyl)ethane, or 2,2-bis(4-hydroxy-3,5-dimethylphenyl)propane, and 4,4'-dihydroxydiphenyl, a bis (4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and a bis(4-hydroxyphenyl) ketone. Those dihydric phenols may be used alone or as a mixture thereof.

Among them, a bis(hydroxyphenyl)alkane-based dihydric phenol is preferred, and bisphenol A is more preferred. When bisphenol A is used as the dihydric phenol, the PC-POS copolymer is such that in the general formula (I), X represents an isopropylidene group and a=b=0.

Examples of the dihydric phenol except bisphenol A include a bis(hydroxyaryl)alkane, a bis(hydroxyaryl)cycloalkane, a dihydroxyaryl ether, a dihydroxydiaryl sulfide, a dihydroxydiaryl sulfoxide, a dihydroxydiaryl sulfone, a dihydroxydiphenyl, a dihydroxydiarylfluorene, and a dihydroxydiaryladamantane. Those dihydric phenols may be used alone or as a mixture thereof.

Examples of the bis(hydroxyaryl)alkane include bis(4-hydroxyphenyl)methane, 1,1-bis(4-hydroxyphenyl) ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl) propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkane include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ether include 4,4'-dihydroxydiphenyl ether and 4,4'-dihydroxy-3,3'-dimethylphenyl ether.

Examples of the dihydroxydiaryl sulfide include 4,4'-dihydroxydiphenyl sulfide and 4,4'-dihydroxy-3,3'-dimethyldiphenyl sulfide. Examples of the dihydroxydiaryl sulfoxide include 4,4'-dihydroxydiphenyl sulfoxide and 4,4'-dihydroxy-3,3'-dimethyldiphenyl sulfoxide. Examples of the dihydroxydiaryl sulfone include 4,4'-dihydroxydiphenyl sulfone and 4,4'-dihydroxy-3,3'-dimethyldiphenyl sulfone.

An example of the dihydroxydiphenyl is 4,4'-dihydroxydiphenyl. Examples of the dihydroxydiarylfluorene include 9,9-bis(4-hydroxyphenyl)fluorene and 9,9-bis(4-hydroxy-3-methylphenyl)fluorene. Examples of the dihydroxydiaryladamantane include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of the dihydric phenol other than the above-mentioned dihydric phenols include 4,4'-[1,3-phenylenebis (1-methylethylidene)]bisphenol, 10,10-bis(4-hydroxyphenyl)-9-anthrone, and 1,5-bis(4-hydroxyphenylthio)-2,3-dioxapentane.

In order to control the molecular weight of the PC-POS copolymer to be obtained, a terminal stopper can be used. Examples of the terminal stopper may include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

After the interfacial polycondensation reaction, the liquid is appropriately left at rest to be separated into an aqueous phase and an organic solvent phase [separation step], the organic solvent phase is washed (preferably washed with a basic aqueous solution, an acidic aqueous solution, and water in the stated order) [washing step], and the resultant organic phase is concentrated [concentration step] and dried [drying step]. Thus, the PC-POS copolymer can be obtained.

[Production Method for Polycarbonate-Based Resin (A-3)]

The aromatic polycarbonate-based resin (A-3) can be obtained by a conventional production method for a polycarbonate. Examples of the conventional method include: an interfacial polymerization method involving causing the dihydric phenol-based compound and phosgene to react with each other in the presence of an organic solvent inert to the reaction and an aqueous alkaline solution, adding a polymerization catalyst, such as a tertiary amine or a quaternary ammonium salt, to the resultant, and polymerizing the mixture; and a pyridine method involving dissolving the dihydric phenol-based compound in pyridine or a mixed solution of pyridine and an inert solvent, and introducing phosgene to the solution to directly produce the resin. A molecular weight modifier (terminal stopper), a branching agent, or the like is used as required in the reaction.

The dihydric phenol-based compound is, for example, a compound represented by the following general formula (v):

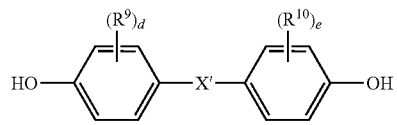

wherein $R^9$, $R^{10}$, X', d, and e are as defined above, and preferred examples thereof are also the same as those described above.

Specific examples of the dihydric phenol-based compound may include those described above in the method of producing each of the polycarbonate-polyorganosiloxane copolymers (A-1) and (A-2), and preferred examples thereof are also the same as those described above. Among them, a bis(hydroxyphenyl)alkane-based dihydric phenol is preferred, and bisphenol A is more preferred.

<Other Component>

The polycarbonate-based resin composition of the present invention may comprise any other additive to the extent that the effects of the present invention are not impaired. Examples of the other additive may include a flame retardant and a flame retardant aid, a release agent, a reinforcing material, a filler, an elastomer for improving impact resistance, a dye, and a pigment.

The polycarbonate-based resin composition of the present invention is obtained by: blending the above-mentioned respective components at the above-mentioned ratios and various optional components to be used as required at appropriate ratios; and kneading the components.

The blending and the kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of from 240° C. to 320° C. An extruder, in particular a vented extruder is preferably used in the melt-kneading molding.

[Molded Article]

Various molded bodies can be produced through the use of the polycarbonate-based resin composition of the present invention subjected to the melt-kneading or a pellet obtained by the composition as a raw material by an injection molding method, an injection compression molding method, an extrusion molding method, a blow molding method, a press molding method, a vacuum molding method, an expansion molding method, and the like. In particular, the pellet obtained by the melt-kneading can be suitably used in the production of injection-molded bodies by injection molding and injection compression molding.

A molded article formed of the PC resin composition of the present invention can be suitably used in, for example, casings for parts for electrical and electronic equipment, such as a television, a radio-cassette player, a video camera, a videotape recorder, an audio player, a DVD player, an air conditioner, a cellular phone, a display, a computer, a register, an electronic calculator, a copying machine, a printer, or a facsimile, and parts for automobiles and building materials.

EXAMPLES

The present invention is more specifically described below by way of Examples. However, the present invention is by no means limited by these examples. Characteristic values and evaluation results in the respective examples were determined in accordance with the following procedures.

(1) Chain Length and Content of Polydimethylsiloxane

The chain length and content of a polydimethylsiloxane were calculated by NMR measurement from the integrated value ratio of a methyl group of the polydimethylsiloxane.

<Quantification Method for Chain Length of Polydimethylsiloxane>

1H-NMR Measurement Conditions
NMR apparatus: ECA500 manufactured by JEOL Resonance Co., Ltd.
Probe: 50TH5AT/FG2
Observed range: −5 ppm to 15 ppm
Observation center: 5 ppm
Pulse repetition time: 9 sec
Pulse width: 45°
NMR sample tube: 5 φ
Sample amount: 30 mg to 40 mg
Solvent: deuterochloroform
Measurement temperature: room temperature
Number of scans: 256 times In the Case of Allylphenol-Terminated Polydimethylsiloxane
A: an integrated value of a methyl group in a dimethylsiloxane moiety observed around δ −0.02 to δ 0.5
B: an integrated value of a methylene group in allylphenol observed around δ 2.50 to δ 2.75
Chain length of polydimethylsiloxane=(A/6)/(B/4)
In the Case of Eugenol-Terminated Polydimethylsiloxane
A: an integrated value of a methyl group in a dimethylsiloxane moiety observed around δ −0.02 to δ 0.5
B: an integrated value of a methylene group in eugenol observed around δ 2.40 to δ 2.70
Chain length of polydimethylsiloxane=(A/6)/(B/4)
<Quantification Method for Content of Polydimethylsiloxane in PC-POS Copolymer>

Example

Quantification Method for Copolymerization Amount of Polydimethylsiloxane in PTBP-terminated Polycarbonate obtained by copolymerizing Allylphenol-terminated Polydimethylsiloxane NMR apparatus: ECA-500 manufactured by JEOL Resonance Co., Ltd.
Probe: TH5 corresponding to 5 c NMR sample tube
Observed range: −5 ppm to 15 ppm
Observation center: 5 ppm
Pulse repetition time: 9 sec
Pulse width: 45°
Number of scans: 256 times
NMR sample tube: 5 φ
Sample amount: 30 mg to 40 mg
Solvent: deuterochloroform
Measurement temperature: room temperature
A: an integrated value of a methyl group in a BPA moiety observed around δ 1.5 to δ 1.9
B: an integrated value of a methyl group in a dimethylsiloxane moiety observed around δ −0.02 to δ 0.3
C: an integrated value of a butyl group in a p-tert-butylphenyl moiety observed around δ 1.2 to δ 1.4
a=A/6
b=B/6
c=C/9
T=a+b+c
f=a/T×100
g=b/T×100
h=c/T×100
TW=f×254+g×74.1+h×149
PDMS (wt %)=g×74.1/TW×100

(2) Viscosity-Average Molecular Weights of Polycarbonate-Polyorganosiloxane Copolymer and Polycarbonate-Based Resin Composition A viscosity-average molecular weight (Mv) was calculated from the following equation (Schnell's equation) by using a limiting viscosity [η] determined through the measurement of the viscosity of a methylene chloride solution (concentration: g/L) at 20° C. with an Ubbelohde-type viscometer.

$$[\eta]=1.23\times10^{-5}\times M_v^{0.83}$$

<Production of Polycarbonate Oligomer>

Sodium dithionite was added in an amount of 2,000 ppm by mass with respect to bisphenol A (BPA) to be dissolved later to 5.6 mass % aqueous sodium hydroxide, and bisphenol A was dissolved in the mixture so that the concentration of bisphenol A was 13.5 mass %. Thus, a solution of bisphenol A in aqueous sodium hydroxide was prepared.

The solution of bisphenol A in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively.

The tubular reactor had a jacket portion and the temperature of a reaction liquid was kept at 40° C. or less by passing cooling water through the jacket.

The reaction liquid that had exited the tubular reactor was continuously introduced into a baffled vessel-type reactor having an internal volume of 40 L provided with a swept-back blade, and then the solution of bisphenol A in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to thereby perform a reaction. The reaction liquid flowing out of the vessel-type reactor was continuously taken out, and then an aqueous phase was separated and removed by leaving the liquid at rest, followed by the collection of a methylene chloride phase.

The concentration of the polycarbonate oligomer thus obtained was 338 g/L and the concentration of a chloroformate group thereof was 0.70 mol/L.

<Polycarbonate-Polyorganosiloxane Copolymer (A-1)>

15 L of the polycarbonate oligomer solution produced in Preparation Example described above, 7.7 L of methylene chloride, 390 g of an o-allylphenol terminal-modified polydimethylsiloxane (PDMS) in which the average chain length n of a polydimethylsiloxane was 40, and 8.3 mL of triethylamine were loaded into a 50-liter vessel-type reactor including a baffle board, a paddle-type stirring blade, and a cooling jacket. 1,389 g of aqueous sodium hydroxide prepared by dissolving 84 g of sodium hydroxide in 966 mL of pure water was added to the mixture under stirring to perform a reaction between the polycarbonate oligomer and the o-allylphenol terminal-modified PDMS for 20 minutes.

A solution of p-t-butylphenol (PTBP) in methylene chloride (prepared by dissolving 145 g of PTBP in 2.0 L of methylenechloride) and a solution of bisphenol A in aqueous sodium hydroxide (prepared by dissolving 1,029 g of bisphenol A in an aqueous solution prepared by dissolving 546 g of sodium hydroxide and 2.1 g of sodium dithionite in 8.0 L of pure water) were added to the polymerization liquid to perform a polymerization reaction for 40 minutes.

13 L of methylene chloride was added to the resultant for dilution and the mixture was stirred for 20 minutes. After that, the mixture was separated into an organic phase containing a polycarbonate-polydimethylsiloxane copolymer (PC-PDMS copolymer), and an aqueous phase containing excess amounts of bisphenol A and sodium hydroxide, and the organic phase was isolated.

The solution of the PC-PDMS copolymer in methylene chloride thus obtained was sequentially washed with 0.03 mol/L aqueous sodium hydroxide and 0.2 mol/L hydrochloric acid in amounts of 15 vol % each with respect to the solution. Next, the solution was repeatedly washed with pure water until an electric conductivity in an aqueous phase after the washing became 5 μS/cm or less.

The solution of the PC-PDMS copolymer in methylene chloride obtained by the washing was concentrated and pulverized, and the resultant flake was dried under reduced pressure at 120° C. Thus, a PC-PDMS copolymer (A-1) was produced.

The resultant PC-PDMS copolymer (A-1) had a PDMS block moiety content determined by NMR of 6.0 mass %, a viscosity number of 47.5, and a viscosity-average molecular weight Mv of 17,700.

<Polycarbonate-Polyorganosiloxane Copolymer (A-2)>

A PC-PDMS copolymer (A-2) was produced in the same manner as in Production of (A-1), except that an o-allylphenol terminal-modified PDMS in which the average chain length n of a polydimethylsiloxane was 90 was used.

The resultant PC-PDMS copolymer (A-2) had a PDMS block moiety content determined by nuclear magnetic resonance (NMR) of 6.0 mass %, a viscosity number of 47.5, and a viscosity-average molecular weight Mv of 17,700.

<(A-3): Aromatic Polycarbonate Resin>

Aromatic homopolycarbonate resin [manufactured by Idemitsu Kosan Co., Ltd., TARFLON FN1700 (product name), viscosity-average molecular weight=17,700]

Aromatic homopolycarbonate resin [manufactured by Idemitsu Kosan Co., Ltd., TARFLON FN1900 (product name), viscosity-average molecular weight=19,100]

Aromatic homopolycarbonate resin [manufactured by Idemitsu Kosan Co., Ltd., TARFLON FN2200 (product name), viscosity-average molecular weight=21,200]

Aromatic homopolycarbonate resin [manufactured by Idemitsu Kosan Co., Ltd., TARFLON FN2500 (product name), viscosity-average molecular weight=23,400]

Aromatic homopolycarbonate resin [manufactured by Idemitsu Kosan Co., Ltd., TARFLON FN3000 (product name), viscosity-average molecular weight=29,800]

Examples 1 to 24, Comparative Examples 1 to 9, and Reference Examples 1 to 3

Respective components were mixed at a ratio shown in each of Tables 1 and 2. The mixture was supplied to a vented twin-screw extruder (manufactured by Toshiba Machine Co., Ltd., TEM-35B), and was melted and kneaded at a screw revolution number of 150 rpm, an ejection amount of 20 kg/hr, and a resin temperature of from 295° C. to 300° C. to provide an evaluation pellet sample. The evaluation pellet sample was dried at 120° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to produce test pieces for performing an Izod test (2 test pieces each measuring 63 mm by 13 mm by 3.2 mm) and a HDT test piece (measuring 126 mm by 13 mm by 3.2 mm). Further, the dried evaluation pellet sample was subjected to injection molding with an injection molding machine (manufactured by Niigata Machine Techno Co., Ltd., MD50XB, screw diameter: 30 mmφ) to produce a test piece for performing total light transmittance measurement (three-stage plate measuring 90 mm by 50 mm, the plate including a 3-millimeter thick portion measuring 45 mm by 50 mm, a 2-millimeter thick portion measuring 22.5 mm by 50 mm, and a 1-millimeter thick portion measuring 22.5 mm by 50 mm).

Results when the respective test pieces are produced by using each of the components (A-1) to (A-3) alone as the component (A) are shown in Reference Examples 1 to 3.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| (A-1) | n = 40 | 53 | 72 | 60 | 23 | 20 | 30 | 50 | 40 | 45 |
| (A-2) | n = 90 | 30 | 8 | 20 | 10 | 20 | 20 | 20 | 20 | 15 |
| (A-3) | FN1700 | 17 | 20 | 20 | 67 | 60 | 50 | 30 | 40 | 40 |
| | FN1900 | | | | | | | | | |
| | FN2200 | | | | | | | | | |
| | FN2500 | | | | | | | | | |
| | FN3000 | | | | | | | | | |
| Si amount | mass % | 4.9 | 4.8 | 4.8 | 2 | 2.4 | 3 | 4.2 | 3.6 | 3.6 |
| Mv | | 17,600 | 17,700 | 17,700 | 17,600 | 17,600 | 17,500 | 17,600 | 17,600 | 17,500 |
| Q value ($10^{-2}$ mL/sec) | | 10 | 10 | 10 | 12 | 11 | 11 | 10 | 11 | 12 |
| Total light transmittance (%) (3-mm thick) | | 87 | 89 | 87 | 87 | 85 | 85 | 86 | 86 | 87 |
| Izod value (kJ/m$^2$) | | | | | | | | | | |
| | 23° C. | 78 | 75 | 76 | 78 | 80 | 78 | 77 | 78 | 80 |
| | −30° C. | 61 | 60 | 67 | 36 | 64 | 67 | 65 | 65 | 67 |
| | −40° C. | 52 | 40 | 57 | 24 | 24 | 30 | 56 | 53 | 56 |
| HDT | ° C. | 124 | 125 | 125 | 127 | 128 | 127 | 126 | 126 | 126 |

| | | Examples | | | | | | | | |
|---|---|---|---|---|---|---|---|---|---|---|
| | | 10 | 11 | 12 | 13 | 14 | 15 | 16 | 17 | 18 |
| (A-1) | n = 40 | 45 | 60 | 15 | 60 | 40 | 45 | 45 | 60 | 50 |
| (A-2) | n = 90 | 10 | 10 | 15 | 20 | 20 | 15 | 10 | 10 | 15 |
| (A-3) | FN1700 | 45 | 30 | 70 | | | | | | |
| | FN1900 | | | | | 30 | 30 | 40 | 13 | 22 |
| | FN2200 | | | | 17 | 10 | 10 | 5 | 17 | 13 |
| | FN2500 | | | | 3 | | | | | |
| | FN3000 | | | | | | | | | |
| Si amount | mass % | 3.3 | 4.2 | 1.8 | 4.8 | 3.6 | 3.6 | 3.3 | 4.2 | 3.9 |
| Mv | | 17,700 | 17,700 | 17,400 | 18,500 | 18,500 | 18,400 | 18,400 | 18,400 | 18,400 |
| Q value ($10^{-2}$ mL/sec) | | 12 | 12 | 12 | 10 | 10 | 10 | 10 | 10 | 10 |
| Total light transmittance (%) (3-mm thick) | | 87 | 88 | 84 | 86 | 85 | 86 | 87 | 87 | 86 |
| Izod value (kJ/m$^2$) | | | | | | | | | | |
| | 23° C. | 80 | 77 | 76 | 81 | 82 | 83 | 83 | 81 | 83 |
| | −30° C. | 63 | 64 | 53 | 71 | 73 | 72 | 70 | 70 | 71 |
| | −40° C. | 34 | 55 | 23 | 62 | 62 | 59 | 41 | 60 | 60 |
| HDT | ° C. | 126 | 124 | 128 | 125 | 126 | 126 | 127 | 125 | 126 |

| | | Examples | | | | | |
|---|---|---|---|---|---|---|---|
| | | 19 | 20 | 21 | 22 | 23 | 24 |
| (A-1) | n = 40 | 47 | 42 | 60 | 60 | 50 | 32 |
| (A-2) | n = 90 | 10 | 15 | 20 | 10 | 15 | 8 |
| (A-3) | FN1700 | | | | | | |
| | FN1900 | | | | | | |
| | FN2200 | 20 | 20 | | | | |
| | FN2500 | 23 | 23 | 4 | 23 | 33 | 57 |
| | FN3000 | | | 16 | 7 | 2 | 3 |
| Si amount | mass % | 3.4 | 3.4 | 4.8 | 4.2 | 3.9 | 2.4 |
| Mv | | 19,600 | 19,500 | 19,700 | 19,700 | 19,700 | 21,700 |
| Q value ($10^{-2}$ mL/sec) | | 7 | 7 | 7 | 7 | 7 | 5 |
| Total light transmittance (%) (3-mm thick) | | 86 | 85 | 86 | 87 | 86 | 86 |
| Izod value (kJ/m$^2$) | | | | | | | |
| | 23° C. | 87 | 87 | 86 | 87 | 87 | 95 |
| | −30° C. | 77 | 79 | 77 | 79 | 79 | 81 |
| | −40° C. | 58 | 63 | 67 | 66 | 68 | 36 |
| HDT | ° C. | 127 | 127 | 125 | 126 | 126 | 130 |

TABLE 2

| | | Comparative Examples | | | | | | | | |
|---|---|---|---|---|---|---|---|---|---|---|
| | | 1 | 2 | 3 | 4 | 5 | 6 | 7 | 8 | 9 |
| (A-1) | n = 40 | | | | | | | 70 | 80 | 90 |
| (A-2) | n = 90 | 60 | 30 | 20 | 15 | 10 | 8 | 30 | 20 | 10 |
| (A-3) | FN1700 | 40 | 70 | 80 | 85 | 90 | 92 | | | |
| | FN2200 | | | | | | | | | |
| | FN2500 | | | | | | | | | |
| | FN3000 | | | | | | | | | |
| Si amount | mass % | 3.6 | 1.8 | 1.2 | 0.9 | 0.6 | 0.5 | 6 | 6 | 6 |
| Mv | | 17,600 | 17,800 | 17,300 | 17,300 | 17,600 | 17,500 | 17,600 | 17,600 | 17,700 |
| Q value ($10^{-2}$ mL/sec) | | 11 | 11 | 13 | 12 | 13 | 13 | 10 | 10 | 10 |
| Total light transmittance (%) | | 71 | 75 | 79 | 83 | 83 | 83 | 86 | 87 | 88 |
| Izod value (kJ/m$^2$) | | | | | | | | | | |
| | 23° C. | 80 | 76 | 74 | 74 | 73 | 73 | 76 | 75 | 74 |
| | −30° C. | 67 | 56 | 22 | 20 | 20 | 18 | 65 | 62 | 66 |
| | −40° C. | 63 | 24 | 18 | 18 | 15 | 14 | 57 | 55 | 62 |
| HDT | ° C. | 128 | 129 | 129 | 129 | 130 | 130 | 123 | 122 | 122 |

TABLE 3

| | | Reference Examples | | |
|---|---|---|---|---|
| | | 1 | 2 | 3 |
| (A-1) | n = 40 | 100 | | |
| (A-2) | n = 90 | | 100 | |
| (A-3) | FN1700 | | | 100 |
| Si amount | mass % | 6 | 6 | 0 |
| Mv | | 17,700 | 17,700 | 17,300 |
| Q value ($10^{-2}$ mL/sec) | | 12 | 13 | 14 |
| Total light transmittance (%) (3-mm thick) | | 89 | 70 | 90 |
| Izod value (kJ/m$^2$) | | | | |
| | 23° C. | 68 | 72 | 73 |
| | −30° C. | 51 | 60 | 13 |
| | −40° C. | 30 | 60 | 10 |
| HDT | ° C. | 121 | 124 | 130 |

[Evaluation Test]

<Izod Impact Strength>

Notches were made in the test pieces for performing an Izod test described in the foregoing by post-processing. The notched Izod impact strengths of the resultant test pieces at −40° C., −30° C., and 23° C. were measured in conformity with ASTM Standard D-256.

<Total Light Transmittance (%)>

A total light transmittance was measured in conformity with ISO 14782. NDH 2000 manufactured by Nippon Denshoku Industries Co., Ltd. was used as a measuring apparatus. The above-mentioned test piece for a transparency evaluation test was used as a test piece.

<Q Value (Flow Value) [Unit; $10^{-2}$ mL/Sec]>

The amount (×$10^{-2}$ mL/sec) of the molten resin of the above-mentioned pellet flowing out of a nozzle having a diameter of 1 mm and a length of 10 mm was measured in conformity with JIS K7210 by using a Koka flow tester at 280° C. under a pressure of 15.7 MPa. A Q value represents the amount of the molten resin flowing out per unit time, and a higher numerical value therefor means that the fluidity of the composition is better.

<Heat Distortion Temperature (HDT)>

A heat distortion temperature (HDT) was measured in conformity with ASTM D648 at a load of 1.83 MPa. The HDT serves as a guideline on heat resistance, and a judgment criterion therefor is as follows: a HDT of 120° C. or more means that the test piece has sufficient heat resistance.

INDUSTRIAL APPLICABILITY

According to the present invention, there can be provided a polycarbonate-based resin composition excellent in impact resistance including low-temperature impact resistance, transparency, and heat resistance by producing a specific polycarbonate-based resin composition containing a polycarbonate-polyorganosiloxane copolymer having a short chain length, a polycarbonate-polyorganosiloxane copolymer having a long chain length, and any other polycarbonate resin.

The invention claimed is:

1. A polycarbonate-based resin composition, comprising:
 a polycarbonate-polyorganosiloxane copolymer (A-1) containing a polycarbonate block formed of a repeating unit represented by the following general formula (I) and a polyorganosiloxane block containing a repeating unit represented by the following general formula (II), the polyorganosiloxane block having an average chain length of 20 or more and less than 60;
 a polycarbonate-polyorganosiloxane copolymer (A-2) containing a polycarbonate block formed of a repeating unit represented by the following general formula (I) and a polyorganosiloxane block containing a repeating unit represented by the following general formula (II), the polyorganosiloxane block having an average chain length of 60 or more and less than 500, and an amount of polyorganosiloxane in the polycarbonate polyorganosiloxane copolymer (A-2) is from 1 mass % to 10 mass %; and
 a polycarbonate-based resin (A-3) except the polycarbonate-polyorganosiloxane copolymer (A-1) and the polycarbonate-polyorganosiloxane copolymer (A-2),
 wherein a weight ratio "(A-1)/(A-2)" of the polycarbonate-polyorganosiloxane copolymer (A-1) to the polycarbonate-polyorganosiloxane copolymer (A-2) is from 60/40 to 99/1,
 wherein the total amount of polyorganosiloxane in the polycarbonate-based resin composition is from 3% mass to 20% mass,
 wherein a ratio of the polycarbonate-based resin (A-3) to a total weight of the polycarbonate-polyorganosiloxane copolymer (A-1), the polycarbonate-polyorganosiloxane copolymer (A-2), and the polycarbonate-based resin (A-3) is 10 mass % or more:

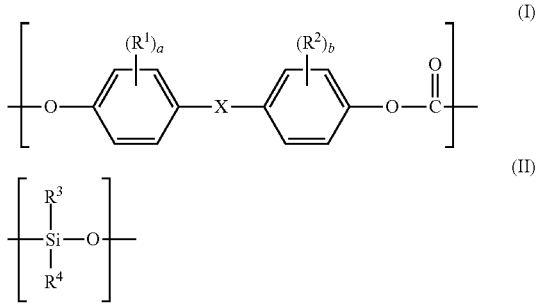

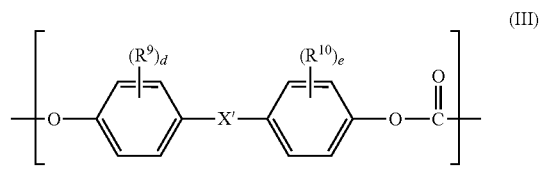

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4; and wherein the polycarbonate-based resin composition does not include a pigment and wherein a 3 mm thick test piece formed of the polycarbonate based resin composition has a total light transmittance of at least 84%.

2. The polycarbonate-based resin composition according to claim 1, wherein a ratio of the polycarbonate-polyorganosiloxane copolymer (A-1) to the total weight of the polycarbonate-polyorganosiloxane copolymer (A-1), the polycarbonate-polyorganosiloxane copolymer (A-2), and the polycarbonate-based resin (A-3) is 70 mass % or less.

3. The polycarbonate-based resin composition according to claim 1, wherein the ratio of the polycarbonate-based resin (A-3) to the total weight of the polycarbonate-polyorganosiloxane copolymer (A-1), the polycarbonate-polyorganosiloxane copolymer (A-2), and the polycarbonate-based resin (A-3) is 20 mass % or more.

4. The polycarbonate-based resin composition according to claim 1, wherein the ratio of the polycarbonate-based resin (A-3) to the total weight of the polycarbonate-polyorganosiloxane copolymer (A-1), the polycarbonate-polyorganosiloxane copolymer (A-2), and the polycarbonate-based resin (A-3) is less than 45 mass %.

5. The polycarbonate-based resin composition according to claim 1, wherein a ratio of the polycarbonate-polyorganosiloxane copolymer (A-2) to the total weight of the polycarbonate-polyorganosiloxane copolymer (A-1), the polycarbonate-polyorganosiloxane copolymer (A-2), and the polycarbonate-based resin (A-3) is 10 mass % or more.

6. The polycarbonate-based resin composition according to claim 1, wherein a ratio of the polycarbonate-polyorganosiloxane copolymer (A-2) to the total weight of the polycarbonate-polyorganosiloxane copolymer (A-1), the polycarbonate-polyorganosiloxane copolymer (A-2), and the polycarbonate-based resin (A-3) is 15 mass % or more.

7. The polycarbonate-based resin composition according to claim 1, wherein a weight ratio "(A-1)/(A-2)" of the polycarbonate-polyorganosiloxane copolymer (A-1) to the polycarbonate-polyorganosiloxane copolymer (A-2) is from 72/28 to 99/1.

8. The polycarbonate-based resin composition according to claim 1, wherein an amount of a polyorganosiloxane in the polycarbonate-polyorganosiloxane copolymer (A-1) is from 1 mass % to 20 mass %.

9. The polycarbonate-based resin composition according to claim 1, wherein the polycarbonate-based resin (A-3) comprises a polycarbonate resin formed only of a repeating unit represented by the following general formula (III):

wherein $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and d and e each independently represent an integer of from 0 to 4.

10. The polycarbonate-based resin composition according to claim 1, wherein the polycarbonate-based resin composition has a viscosity-average molecular weight of from 12,000 to 30,000.

11. The polycarbonate-based resin composition according to claim 1, wherein the polycarbonate-based resin composition has a viscosity-average molecular weight of from 18,000 to 22,000.

12. The polycarbonate-based resin composition according to claim 1, wherein the polycarbonate-polyorganosiloxane copolymer (A-1) has a viscosity-average molecular weight of from 12,000 to 30,000.

13. The polycarbonate-based resin composition according to claim 1, wherein the polycarbonate-polyorganosiloxane copolymer (A-2) has a viscosity-average molecular weight of from 12,000 to 30,000.

14. The polycarbonate-based resin composition according to claim 1, wherein the polycarbonate-based resin (A-3) has a viscosity-average molecular weight of from 12,000 to 50,000.

15. The polycarbonate-based resin composition according to claim 1, wherein the polycarbonate-based resin (A-3) has a viscosity-average molecular weight of from 19,000 to 30,000.

16. The polycarbonate-based resin composition according to claim 1, wherein the amount of the polycarbonate-polyorganosiloxane copolymer (A-2) is from 3.3% to 20% by mass.

* * * * *